United States Patent
Engel et al.

(10) Patent No.: US 10,304,333 B2
(45) Date of Patent: May 28, 2019

(54) METHOD AND VEHICLE COMMUNICATION SYSTEM FOR DETERMINING A DRIVING INTENTION FOR A VEHICLE

(71) Applicant: VOLKSWAGEN AKTIENGESELLSCHAFT, Wolfsburg (DE)

(72) Inventors: Monique Engel, Braunschweig (DE); Stefan Gläser, Braunschweig (DE); Bernd Rech, Bokensdorf (DE); Teodor Buburuzan, Braunschweig (DE); Bernd Lehmann, Wolfsburg (DE); Sandra Kleinau, Rötgesbüttel (DE); Hendrik-Jörn Günther, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/773,211

(22) PCT Filed: Oct. 13, 2016

(86) PCT No.: PCT/EP2016/074562
§ 371 (c)(1),
(2) Date: May 3, 2018

(87) PCT Pub. No.: WO2017/076597
PCT Pub. Date: May 11, 2017

(65) Prior Publication Data
US 2018/0322782 A1  Nov. 8, 2018

(30) Foreign Application Priority Data

Nov. 4, 2015 (DE) .......................... 10 2015 014 131
Mar. 29, 2016 (DE) .......................... 10 2016 205 141

(51) Int. Cl.
G08G 1/00 (2006.01)
G08G 1/0967 (2006.01)
(Continued)

(52) U.S. Cl.
CPC . *G08G 1/096791* (2013.01); *G08G 1/096741* (2013.01); *G08G 1/163* (2013.01);
(Continued)

(58) Field of Classification Search
CPC ....... G08G 1/096791; G08G 1/096741; G08G 1/163; G08G 1/166; G08G 1/167; G08G 1/22; H04W 4/46
(Continued)

(56) References Cited

U.S. PATENT DOCUMENTS 8,847,787 B2    9/2014  Goudy et al.
9,176,500 B1 *  11/2015 Teller ................... G05D 1/0088
(Continued)

FOREIGN PATENT DOCUMENTS

DE   102010002093 A1   12/2010
DE   102009027535 A1    1/2011
(Continued)

OTHER PUBLICATIONS

Search Report for International Patent Application No. PCT/EP2016/074562; dated Jan. 30, 2017.

*Primary Examiner* — Kerri L McNally
*Assistant Examiner* — Thang D Tran
(74) *Attorney, Agent, or Firm* — Barnes & Thornburg LLP

(57) ABSTRACT

A method and a transportation vehicle communication system for determining a driving intention for a transportation vehicle. The driving intention includes information about a predicted driving maneuver. The method includes determining a position of the transportation vehicle; identifying a
(Continued)

road section based on the position of the transportation vehicle and a digital map; obtaining information about internal trigger variables for determining a current driving intention based on on-board sensors or actuators of the transportation vehicle; and determining the driving intention based on the road section, the information about the internal trigger variables, and the one or more trigger conditions. One or more possible driving intentions are associated with the road section. One or more trigger conditions are associated with the one or more possible driving intentions based on one or more trigger variables.

19 Claims, 2 Drawing Sheets

(51) Int. Cl.
    *G08G 1/16*     (2006.01)
    *H04W 4/46*     (2018.01)

(52) U.S. Cl.
    CPC ............ *G08G 1/166* (2013.01); *G08G 1/167* (2013.01); *G08G 1/22* (2013.01); *H04W 4/46* (2018.02)

(58) Field of Classification Search
    USPC .......................................... 340/902
    See application file for complete search history.

(56) References Cited

U.S. PATENT DOCUMENTS

| | | | | |
|---|---|---|---|---|
| 9,600,768 | B1* | 3/2017 | Ferguson | G06N 5/02 |
| 2008/0007428 | A1* | 1/2008 | Watanabe | B60R 1/00 |
| | | | | 340/901 |
| 2009/0224942 | A1* | 9/2009 | Goudy | G08G 1/096783 |
| | | | | 340/905 |
| 2010/0198513 | A1* | 8/2010 | Zeng | B60W 40/02 |
| | | | | 701/300 |
| 2010/0253539 | A1* | 10/2010 | Seder | G01S 13/723 |
| | | | | 340/903 |
| 2010/0324823 | A1* | 12/2010 | Kobayashi | B60T 7/22 |
| | | | | 701/301 |
| 2012/0016581 | A1* | 1/2012 | Mochizuki | G08G 1/161 |
| | | | | 701/301 |
| 2012/0310465 | A1* | 12/2012 | Boatright | B60Q 1/346 |
| | | | | 701/25 |
| 2013/0342368 | A1* | 12/2013 | Nathanson | G07C 5/008 |
| | | | | 340/903 |
| 2014/0195093 | A1* | 7/2014 | Litkouhi | B62D 15/0255 |
| | | | | 701/23 |
| 2014/0200782 | A1* | 7/2014 | Goudy | G08G 1/161 |
| | | | | 701/70 |
| 2014/0309862 | A1* | 10/2014 | Ricci | G01C 21/00 |
| | | | | 701/36 |
| 2014/0309927 | A1* | 10/2014 | Ricci | B60Q 1/00 |
| | | | | 701/424 |
| 2014/0343836 | A1 | 11/2014 | Maise | |
| 2015/0032362 | A1* | 1/2015 | Goudy | G08G 1/166 |
| | | | | 701/301 |
| 2015/0061895 | A1 | 3/2015 | Ricci | |
| 2015/0235140 | A1* | 8/2015 | Rothermel | B60W 30/18163 |
| | | | | 706/52 |
| 2015/0254977 | A1* | 9/2015 | Grabow | G08G 1/0141 |
| | | | | 340/903 |
| 2016/0152237 | A1* | 6/2016 | Takahashi | B60W 30/02 |
| | | | | 701/41 |
| 2017/0016734 | A1* | 1/2017 | Gupta | G01C 21/3697 |
| 2017/0018182 | A1* | 1/2017 | Makled | G01C 21/36 |
| 2017/0057496 | A1* | 3/2017 | Toyoda | B60W 10/04 |
| 2017/0243518 | A1* | 8/2017 | Kanemaru | G06F 17/30 |

FOREIGN PATENT DOCUMENTS

| | | |
|---|---|---|
| DE | 102012218935 A1 | 4/2013 |
| DE | 102013003219 A1 | 9/2013 |
| DE | 102012023361 A1 | 5/2014 |
| DE | 102013208758 A1 | 11/2014 |

\* cited by examiner

METHOD AND VEHICLE COMMUNICATION SYSTEM FOR DETERMINING A DRIVING INTENTION FOR A VEHICLE

PRIORITY CLAIM

This patent application is a U.S. National Phase of International Patent Application No. PCT/EP2016/074562, filed 13 Oct. 2016, which claims priority to German Patent Application Nos. 10 2015 014 131.7, filed 4 Nov. 2015, and 10 2016 205 141.5, filed 29 Mar. 2016, the disclosures of which are incorporated herein by reference in their entireties.

SUMMARY

Illustrative embodiments relate to a method and to a transportation vehicle communication system for determining a driving intention for a transportation vehicle, to be more precise, but not exclusively, based on an assignment of sections of road and possible driving intentions as well a use of triggering conditions and trigger variables.

BRIEF DESCRIPTION OF THE DRAWINGS

Disclosed embodiments are described in more detail below with reference to the drawings, in which.

DETAILED DESCRIPTION

Figure 1:
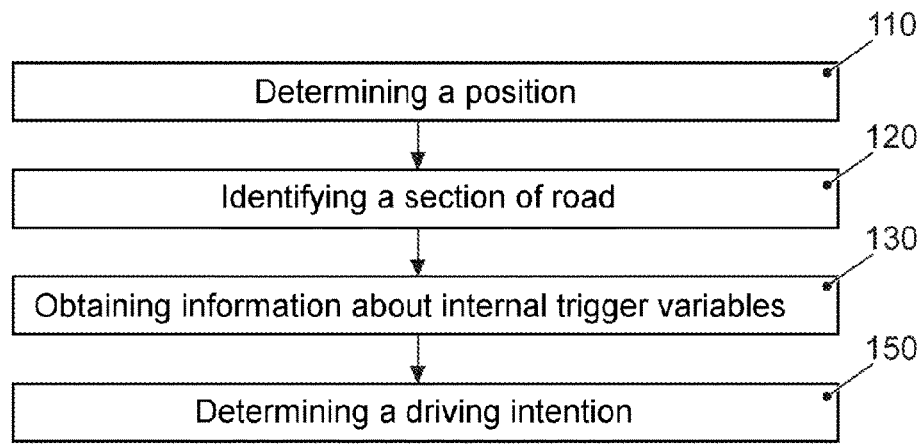
FIG. 1 illustrates a flow chart of an exemplary embodiment of a method for determining a driving intention for a transportation vehicle.

Vehicle-to-vehicle communication (also referred to as Car2Car, C2C or Vehicle2Vehicle, V2V) and vehicle-to-vehicle infrastructure communication (also referred to as Car2Infrastructure, C2I or Vehicle2Roadside, V2R) is a focal point of transportation vehicle research in the 21st century. The communication between transportation vehicles or between transportation vehicles or the traffic infrastructure permits a large number of new possibilities, for example, it allows transportation vehicles to be coordinated with one another or communication of transportation vehicles with the traffic infrastructure, for example, to make available traffic jam warnings to the transportation vehicles. In this context, the transportation vehicles which are designed for C2C or C2I (also subsumed under vehicle-to-X-communication, Car2X, C2X or Vehicle2X, V2X) have a transceiver unit to be able to communicate with other transportation vehicles, for example, via direct radio links or mobile radio networks. The communication may be limited in this context between the transportation vehicles or between transportation vehicles and the transportation vehicle infrastructure within a radius of several hundred meters.

The coordination of transportation vehicles, for example, for the purpose of cooperative execution of driving maneuvers or for the coordination of automated transportation vehicles, is frequently dependent on the availability of messages from the cooperating transportation vehicles and on the quality of the data. To be able to carry out cooperation, it is necessary in many cases to make available messages about a driving intention of a driver, to which messages the transportation vehicles in the surroundings can react.

There is a need for an improved concept for assisting cooperative driving functions. This need is met by the method and the transportation vehicle communication system as claimed in the independent claims.

Exemplary embodiments achieve this, for example, by determining a driving intention of a driver of the transportation vehicle. On the basis of internal and, if appropriate, external, trigger variables, possible driving intentions for a traffic situation are checked on the basis of triggering conditions. The driving intentions which are possible in a situation depend here on a current section of road—for example, there are frequently different possible driving intentions when travelling on entry slip roads to the freeways, straight sections of road without junctions or intersections. The possible driving intentions are evaluated on the basis of the trigger variables and a probable driving intention is determined on the basis thereof.

Exemplary embodiments provide a method for determining a driving intention for a transportation vehicle. The driving intention comprises information about a predicted driving maneuver. The method comprises determining a position of the transportation vehicle. The method also comprises identifying a section of road on the basis of the position of the transportation vehicle and a digital map. One or more possible driving intentions are assigned to the section of road. The one or more possible driving intentions are assigned one or more triggering conditions on the basis of one or more trigger variables. The method also comprises obtaining information about internal trigger variables for the determination of a current driving intention on the basis of on-board sensors or actuators of the transportation vehicle. The method also comprises determining the driving intention on the basis of the section of road, the information about the internal trigger variables and the one or more triggering conditions. The driving intention can be used for more efficient coordination of transportation vehicles in the case of coordinated driving maneuvers. The determination of the driving intention on the basis of the sections of route and the trigger variables permits determination of the driving intention without making additional demands on the driver of the transportation vehicle.

In many exemplary embodiments, the method can also comprise making available a driving intention message via a vehicle-to-vehicle interface on the basis of the driving intention. The making available of the driving intention message permits cooperative driving maneuvers and driving functions.

In some exemplary embodiments, the determination of the position corresponds to satellite-based determination of the position. The satellite-based determination of the position permits the use of digital maps which may, for example, have already been present for navigation applications.

In many exemplary embodiments, the method can also comprise obtaining information about external trigger variables for the determination of the driving intention via a vehicle-to-vehicle interface. The determination can also be based on the information about the external trigger variables. The one or more trigger variables can comprise, for example, the internal trigger variables and/or the external trigger variables. The use of the external trigger variables permits other road users to be included (for the analysis of a traffic situation), for example, their position and/or driving intention, and an expansion of the trigger variables, for example, through the use of information on the surroundings from sensors of other transportation vehicles.

The information about the external trigger variables can comprise at least one element from the group of vehicle-to-vehicle status messages, vehicle-to-vehicle driving intention messages and vehicle-to-vehicle messages with information on the surroundings of one or more other transportation vehicles 200. The use of the vehicle-to-vehicle messages permits other road users to be included (for the analysis of a traffic situation), for example, their position and/or driving intention and an expansion of the trigger variables, for example, through the use of information on the surroundings from sensors of other transportation vehicles.

In at least some exemplary embodiments, the triggering conditions can be based on one or more probability functions on the basis of the trigger variables. The use of probability functions permits alternative actions to be weighed up, and permits contradictory trigger variables to be evaluated and used.

In some exemplary embodiments, the determination can also be based on a navigation function of the transportation vehicle. The navigation function can be used as a strong indicator for a driving intention, since it is possible to predict turning off decisions on the basis of the navigation function.

In at least some exemplary embodiments, the determination can also be based on information about traffic regulations. The determination of the driving intention can determine the driving intention in such a way that no traffic regulations are infringed. The use of the traffic regulations, for example, of regulations regarding distances between transportation vehicles or regulations regarding maximum speeds, permits the possible or probable driving intentions to be restricted and permits more precise determination of the driving intention.

In many exemplary embodiments, the determination can be based on a learning function. The determination can also base the driving intention on preceding driving maneuvers of a driver of the transportation vehicle. A use of the preceding driving maneuvers by a learning function permits more precise determination of the driving intention by taking into account a driving style or driving dynamics of the driver.

Exemplary embodiments also provide a transportation vehicle communication system for determining a driving intention for a transportation vehicle. The driving intention comprises information about a predicted driving maneuver. The transportation vehicle communication system is designed to determine a position of the transportation vehicle. The transportation vehicle communication system is also designed to identify a section of road on the basis of the position of the transportation vehicle and a digital map. One or more possible driving intentions are assigned to the section of road. The one or more possible driving intentions are assigned one or more triggering conditions on the basis of one or more trigger variables. The transportation vehicle communication system is also designed to obtain information about internal trigger variables for the determination of a current driving intention on the basis of on-board sensors or actuators of the transportation vehicle. The transportation vehicle communication system is also designed for the transportation vehicle communication system determining the driving intention on the basis of the section of road, the information about the internal trigger variables and the one or more triggering conditions.

Exemplary embodiments also provide a transportation vehicle comprising the transportation vehicle communication system. Exemplary embodiments also provide a program with a program code for carrying out at least the method when the program code is executed on a computer, a processor, a control module or a programmable hardware component.

Various exemplary embodiments will now be described in more detail with reference to the appended drawings in which a number of exemplary embodiments are illustrated. In the figures, the thickness dimensions of lines, layers and/or regions are illustrated in an exaggerated form for the sake of clarity.

In the following description of the appended figures, which merely show a number of exemplary embodiments, identical reference symbols can denote identical or comparable components. In addition, summarizing reference symbols can be used for components and objects, symbols occurring repeatedly in an exemplary embodiment or in a drawing but being used jointly for one or more features. Components or objects which are described with the same or summarizing reference symbols can be implemented in the same way, but also differently for individual, multiple or for all the features, for example, for their dimensions, unless other information becomes explicitly or implicitly apparent from the description.

Although exemplary embodiments can be modified and changed in various ways, exemplary embodiments in the figures are illustrated as examples and are described in detail herein. However, to be clear it should be noted that it is not intended to limit the exemplary embodiments to the respectively disclosed forms but rather that exemplary embodiments should cover all the functional and/or structural modifications, equivalents and alternatives which are covered by the scope of the disclosure. Identical reference symbols denote identical or similar elements in the entire description of the figures.

It is to be noted that an element which is referred to as being "connected" or "coupled" to another element, can be directly connected or coupled to the other element or that intermediate elements can be present. If, in contrast, an element is referred to as being "directly connected" or "directly coupled" to another element, there are no intermediate elements present. Other terms which are used to describe the relationship between elements should be interpreted in a similar way (e.g., "between" as opposed to "directly between", "adjacent" as opposed to "directly adjacent" etc.).

The terminology which is used herein serves only for the purpose of describing specific exemplary embodiments and is not intended to limit the exemplary embodiments. As used herein, the singular forms "a", "an", "one" and "the" are intended also to include the plural forms unless the context clearly indicates otherwise. In addition, to clarify it is to be noted that the expressions such as, e.g., "includes", "including", "has", "comprises", "comprising" and/or "having" as used herein indicate the presence of specified features, integers, operations, working sequences, elements and/or components, but do not exclude the presence or the addition of one or more features, integers, operations, working sequences, elements, components and/or groups thereof.

Unless defined otherwise, all the terms used herein (including technical and scientific terms) have the same meaning, which an average person skilled in the art assigned to them in the field in which the exemplary embodiments belong. In addition, to clarify it is to be noted that expressions, e.g., those which are defined in generally used dictionaries, are to be interpreted as if they had the meaning which is consistent with their meaning in the context of the relevant technology, and are not to be interpreted in an idealized or excessively formal sense, unless expressly defined otherwise herein.

Cooperative driving functions in which the V2X technology is used make a contribution to improving the traffic flow, to avoiding traffic accidents and to increasing the driving comfort. In V2X technology communication takes place which is either direct or indirect (e.g., by a base station), with an exchange of messages between the road users and with the road-side infrastructure. V2X communication combines the vehicle-vehicle (V2V) and the vehicle-infrastructure (V2I) communication.

In V2X communication different messages are exchanged. One type of message is the abovementioned Intention Message which contains information about driving intentions. In the case of an automatic driving operation, driving intention messages can be derived from the route planning and path planning. In the case of partially automatic driving (e.g., with manual transverse guidance) or of manual driving, driving intentions can, for example, be input explicitly by the driver or be estimated by the transportation vehicle system on the basis of a situation analysis. The detection of the driving intention can be used as a trigger condition for starting a function or a driving maneuver and/or for outputting a driving intention message. In this context, the approach involving a location-based trigger condition is expanded in the text which follows.

The activation, the aborting and the ending of a cooperative driving function or of a cooperative maneuver can take place when specific trigger conditions are met. The associated trigger variables/signals are, for example, continuously observed by the transportation vehicle system and evaluated according to the criterion of the meeting of the trigger conditions. Trigger conditions are understood to be triggering criteria, triggering parameters or a number of predetermined events and/or parameters which bring about the triggering of a signal, of an action or of a function.

Trigger variables are supplied, in at least some exemplary embodiments, by the on-board sensor system. In addition, V2X messages from other road users or from road-side infrastructure can also serve as trigger variables. One idea is to use the trigger variables obtained from external signal sources via V2X communication in combination with the internally generated trigger variables to activate, abort or end functions or maneuvers.

In some exemplary embodiments it is a precondition that the transportation vehicle knows the road profile and its position, for example, from a digital map and using a system for determining positions, such as GPS. On the basis of the calculated position of the driver's own transportation vehicle on a digital map (stored, received by V2X technology or determined at the running time from sensor data), sections of road (possibly with detailing for the lanes) can be identified in which there is a large probability of specific driving intentions being present. For example, the "cutting in" intention can be assumed in the case of transportation vehicles on slip roads, before lane closures or before instructions in the roadway for excessively wide transportation vehicles. The start of the intention can be derived from analysis of the road profile. For example, the start of the "cutting into the freeway" intention can be defined as the time at which the transportation vehicle drives on to the entry slip road to the freeway.

There are situations in which there is a large probability that it can be assumed that specific intention is present, such as, for example, the "lane change" intention before the end of a lane (for example, owing to roadworks). However, situations are also conceivable in which there is a smaller probability of the intention being present because basically there are multiple options for action. One example is the request by a navigation system to change lane or turn off in a specific area of road if straight-ahead travel is also possible on the current lane. Information from the navigation system can basically also be used as trigger variables.

Therefore, the disclosed embodiments also propose that the individual trigger variables are assigned a probability of the intention being present if the trigger variable meets its trigger condition. This includes analysis of the options for action and also takes into account in this context the locally applicable traffic regulations. Basically, transportation vehicles can access correspondingly necessary information, for example, by a backend connection or a roadside camera and map data.

FIG. 1 illustrates a flowchart of an exemplary embodiment of a method for determining a driving intention for a transportation vehicle 100. The driving intention comprises information about a predicted driving maneuver. In some exemplary embodiments, the driving intention can comprise information about a predicted trajectory of the predicted driving maneuver, for example, as a time/position indication or as an indication of a target range of the driving intention. The driving intention can comprise, for example, information about a future cutting in request, a future overtaking request or a future turning off request of the transportation vehicle 100. Driving intentions can also be, for example, a lane change, cutting in, parking, leaving a parking space or allocation of road area for maneuvers.

In at least some exemplary embodiments, the transportation vehicle 100 can correspond, for example, to a land transportation vehicle, a road transportation vehicle, a car, a motorized transportation vehicle or a truck.

Figure 2:
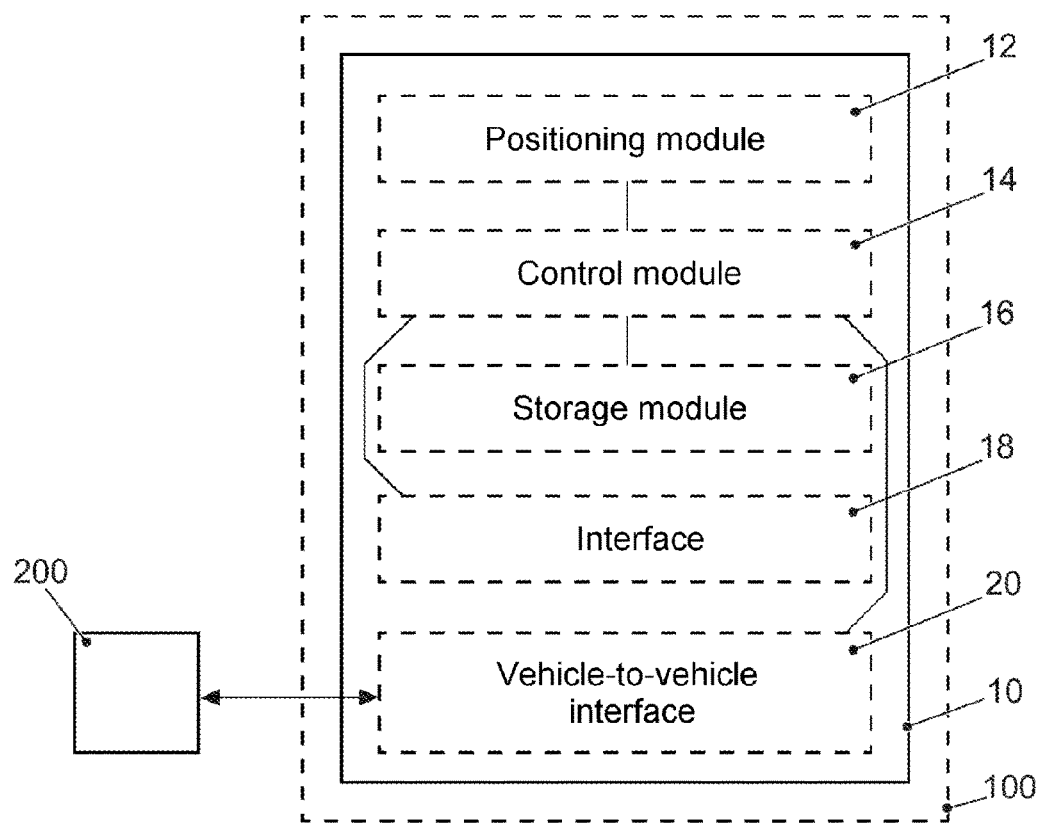
FIG. 2 illustrates a block diagram of an exemplary embodiment of a transportation vehicle communication system.

FIG. 2 illustrates a block diagram of an exemplary embodiment of a transportation vehicle communication system 10 designed for the implementation of the device.

The method comprises determining 110 a position of the transportation vehicle 100. In at least some exemplary embodiments the determination 110 can correspond to satellite-based determination of the position. The position can correspond, for example, to absolute coordinates or coordinates relative to a global or supra-regional reference point. In at least some exemplary embodiments the position can correspond to geographic coordinates or coordinates of a global positioning system (GPS). In at least some exemplary embodiments, the transportation vehicle communication system 10 can comprise a positioning module 12, designed for the determination 110 of the position of the transportation vehicle.

The method also comprises identifying 120 a section of road on the basis of the position of the transportation vehicle and a digital map. One or more possible driving intentions are assigned to the section of road. The one or more possible driving intentions are assigned one or more triggering conditions on the basis of one or more trigger variables. In at least some exemplary embodiments the transportation vehicle communication system 10 can comprise a monitoring module 14 designed to perform identification 120, and/or a storage module 16 designed to store the digital map. The digital map can comprise the one or more driving intentions and the one or more triggering conditions of the driving intentions.

For example, the digital map can comprise an assignment of the sections of road to the driving intentions and the triggering conditions. For example, the digital map can comprise information for the sections of road about the extent of the respective section of road, information about one or more possible driving intentions for the respective section of road and/or information about the triggering conditions for the respective driving intentions, to make it possible to decide between the multiple driving intentions, and, for example, to estimate whether a driving intention can be estimated, for example, whether a probability for a driving intention on the basis of the trigger variables is high enough. In some exemplary embodiments, the digital map can comprise, for example, an allocation of positions or regions to sections of roads. For example, the digital map may only include locations in which roads are accessible.

In some exemplary embodiments, the digital map can be included in the map information of a navigation module of the transportation vehicle 100. For example, the digital map can be at least partially renewed periodically or in an event-based state, for example, when the transportation vehicle 100 is serviced, via a mobile radio system or by vehicle-to-vehicle infrastructure communication from traffic infrastructure at the edge of the road (also referred to as roadside unit).

For example, in the case of roadworks the digital map can be renewed at least temporarily by vehicle-to-infrastructure communication. Alternatively or additionally, the control module 14 can be designed to obtain the digital map as sections of road or as a region from the traffic infrastructure at the edge of the road.

In some exemplary embodiments, the sections of road can be based on patterns, wherein the patterns can comprise, for example, at least one element from the group of turning off lane, intersection, intersection with traffic lights, section of road with overtaking possibility, freeway junction, road with acceleration lane, roundabout, entry slipway, lane closure, roadway constriction, road with parking possibility and car park. For example, the digital map can comprise an assignment of positions to patterns of sections of road. In some exemplary embodiments, the method can also comprise determination of the digital map on the basis of sensor data. For example, the determination of the digital map can comprise how many lanes the road has, whether there is a constriction in the road, whether there is an entry slipway to the road, whether the road permits overtaking maneuvers (on the basis of the number of lanes/road signs) etc. For example, the determination of the digital map can comprise detection of a pattern of a section of road to be traveled on, on the basis of camera sensor data, distance/transit time sensor data and/or vehicle-to-infrastructure communication from traffic infrastructure at the edge of the road. For example, the determination of the digital can comprise detecting the pattern of the section of road to be traveled on.

In at least some exemplary embodiments, the triggering conditions relate to the one or more trigger variables. For example, the triggering conditions can correspond to threshold values, and if the associated trigger variable exceeds or undershoots the threshold value, this can support or undermine a driving intention. Alternatively or additionally, the triggering conditions can be based on one or more probability functions based on the trigger variables. For example, the probability functions can calculate a probability for the occurrence of a driving maneuver of a driving intention on the basis of one or more trigger variables. For example, the probability functions can be defined cumulatively. For example, a combination of trigger variables in a probability function can be intended, wherein the different trigger variables can have different weighting.

The method also comprises obtaining 130 information about internal trigger variables for the determination of a current driving intention, on the basis of on-board sensors or actuators of the transportation vehicle 100. The internal trigger variables can be included, for example, in the trigger variables. In at least some exemplary embodiments, the internal trigger variables can correspond to sensor data of the on-board sensors, for example, sensor raw data or processed sensor data. The obtaining process 130 can be carried out, for example, via a transportation vehicle-control bus, for example, via a control network (also referred to as Controller Area Network, CAN). For example, an interface 18 of the transportation vehicle communication system 10 can be used for this purpose.

In exemplary embodiments, the positioning module 12 can be implemented as any desired component which permits identification or determination of information relating to a position of the device or of the positioning module 12. For example, receivers for satellite-assisted navigation systems, e.g., a GPS (Global Positioning System) receiver or else other components which permit positions to be determined, for example, by triangulation of received radio signals, are conceivable. The position of the transportation vehicle 100 can comprise, for example, an absolute position of the transportation vehicle 100, for example, as a length dimension or width dimension or as a GPS coordinate, or a relative position of the transportation vehicle, for example, relative to coordinates of the digital map.

In exemplary embodiments the control module 14 can correspond to any desired controller or processor or to a programmable hardware component. For example, the control module 14 can also be implemented as software which is programmed for a corresponding hardware component. In this respect, the control module 14 can be implemented as programmable hardware with correspondingly adapted software. In this context, any desired processors such as digital signal processors (DSPs) can be used. Exemplary embodiments are not limited here to a specific type of processor. Any desired processors or else a plurality of processors are conceivable for implementing the control module 14. The control module 14 is designed, for example, to execute the method operations at 110-160.

The storage module 16 can comprise, for example, at least one element of the group of computer-readable storage medium, magnetic storage medium, optical storage medium, hard disk, flash memory, diskette, random access memory, programmable read only memory (PROM), erasable programmable read only memory (EPROM), electronically erasable programmable read only memory (EEPROM), and network memories.

The at least one interface 18 can correspond, for example, to one or more inputs and/or to one or more outputs for receiving and/or transmitting information, for example, in digital bit values, based on a code, within a module, between modules or between modules of different entities.

The information about the internal trigger variables can comprise, for example, information about at least one element of the group of speed of the transportation vehicle 100, differential speed of the transportation vehicle 100 with respect to another transportation vehicle, acceleration of the transportation vehicle 100, distance from other road users, distance from obstacles, activation of the brake pedal, accelerator pedal or clutch pedal, rotation of the steering wheel (changing the angle or torque), manual input (activation of an operator control element, for example, pushbutton keys on the steering wheel, flashing indicator light lever), viewing direction of the driver, voice input, gesture of the driver, expiry of a time interval, reaching of a time, position of the transportation vehicle, weather conditions, detected rain, and intervention of a safety system.

The triggering conditions can be based, for example, on the internal trigger variables. Trigger conditions can be, for example:
- exceeding/undershooting of limiting values of on-board sensor/actuator signals
  - speed limiting value
  - differential speed limiting value
  - acceleration limiting value
  - distance limiting value from other road users or obstacles, such as, for example, transportation vehicles, cyclists, pedestrians, crash barriers (fixed obstacles)
- information from driver interactions such as activation of the brake pedal, accelerator pedal or clutch pedal, rotation of the steering wheel (changing the angle or torque), manual input (activation of an operator control element, for example, pushbutton keys on the steering wheel, flashing indicator light lever), viewing direction of the driver, voice input, gesture.
- Chronological: it is possible to define time-dependent trigger conditions such as, for example, the expiry of a defined time interval or the reaching of a specific time.
- Positional: if the transportation vehicle has reached a specific position, a function or a maneuver can be activated. The transportation vehicle determines its position for this purpose, for example, with GPS, and compares its position with data in a digital map.
- Weather conditions: weather conditions can be trigger conditions or a trigger precondition. For example, detected rain and an ESP intervention for intervening driver assistance system can constitute a pre-condition.

The method also comprises determination 150 of the driving intention on the basis of the section of road, the information about the internal trigger variables and the one or more triggering conditions. The determination 150 can comprise, for example, calculation and probability functions for the triggering conditions on the basis of the trigger variables. For example, the determination 150 can correspond, for example, to checking individual triggering conditions. Alternatively or additionally, the determination 150 can correspond to calculation of a cumulated probability value on the basis of a plurality of triggering conditions. To reduce the probability of faults, a plurality of trigger variables can be linked in one triggering condition in some exemplary embodiments.

In some exemplary embodiments the determination 150 can be based on a learning function. The determination 150 can calculate the driving intention, for example, also on the basis of preceding driving maneuvers of a driver of the transportation vehicle. For example, information about the preceding driving maneuvers of the driver can be stored in the memory module 16, and/or the method could also comprise determination and/or storage of the information about the preceding driving maneuvers. The information about the preceding driving maneuvers can comprise, for example, information about the probability of the execution of a driving maneuver, for example, of an overtaking maneuver, by the driver of the transportation vehicle 100. For example, the method can also comprise calculation of the probability of the execution of the driving maneuver on the basis of the stored driving maneuvers.

In some exemplary embodiments, the determination 150 can also be based on a navigation function of the transportation vehicle 100. For example, route planning of the navigation function can be used to determine the driving intention, for example, on the basis of lane change instructions or turning off instructions.

In some exemplary embodiments, the determination 150 can also be based on information about traffic regulations. The determination 150 of the driving intention can determine the driving intention in such a way that no traffic regulations are infringed. Alternatively or additionally, the determination 150 can rule out driving intention of the one or more driving intentions if they violate the traffic regulations, for example, with the use of tolerance variables. For example, the traffic regulations can be adapted locally. The digital map can comprise, for example, the information about the traffic regulations as information about local traffic regulations. Alternatively or additionally, the local traffic regulations can also be based on a roadside camera, a light signal camera and/or messages of a light signal system.

According to the disclosure, other scenarios can also be treated. For example, during the determination 150 the probability of the intention of the lane change for the purpose of overtaking can be increased if the speed of the transportation vehicle in question (for example, when travelling with ACC (Adaptive Cruise Control)) becomes increasingly higher compared to a relatively slow transportation vehicle which is travelling in front of the transportation vehicle in question, or the distance becomes shorter. It would also be possible to derive intentions from the outputting of a driver assistance function (parking assistance, turning off assistant, overtaking assistant) or from the route guidance of a navigation system. In this context, it is also possible to refer to specific intentions from utility transportation vehicles which have to occupy areas of road of adjacent lanes for planned maneuvers, as result of which hazard zones are produced for the other road users. Finally, it is also necessary to mention the interaction of the driver who would like to initiate a lane change for other reasons than the abovementioned ones.

Figure 1A:
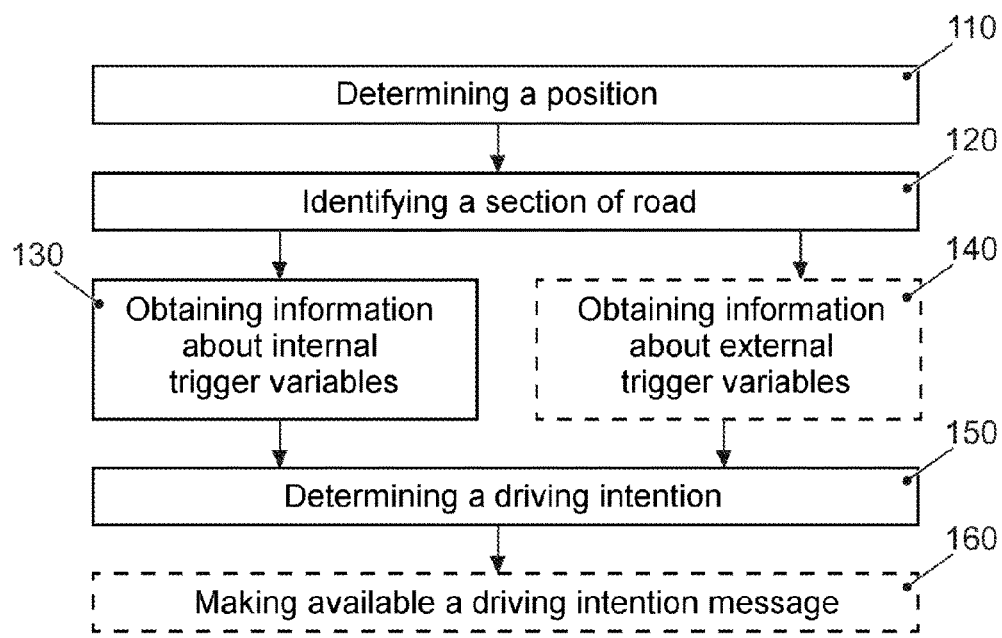
FIG. 1a illustrates a flow chart of a further exemplary embodiment of the method for determining the driving intention for the transportation vehicle.

In at least some exemplary embodiments, the method can, as shown in FIG. 1a, also comprise making available 160 a driving intention message via a vehicle-to-vehicle interface, for example, via a vehicle-to-vehicle interface 20 of the transportation vehicle communication system 10 on the basis of the driving intention. For example, the making available 160 can correspond to a periodic or a single making available process. For example, the making available 160 can correspond to direct making available of the driving intention message to transportation vehicles in the surroundings of the transportation vehicle 100 via a wireless interface.

The vehicle-to-vehicle interface, for example, the vehicle-to-vehicle interface 20, can be designed, for example, to communicate over a shared communication channel (also referred to as broadcast channel). In some exemplary embodiments, a vehicle-to-vehicle communication of the vehicle-to-vehicle interface can correspond either to a direct wireless communication connection between two transportation vehicle, for example, without the use of a base station, for example, according to IEEE 802.11p (a Standard of the Institute of Electrical and Electronics Engineers) or an indirect communication connection (e.g., by a base station). The vehicle-to-vehicle interface 20 can be designed, for example, to communicate in a wireless state directly with further transportation vehicles in the surroundings.

The trigger conditions can be supplemented not only with internal variables but also with external V2X variables as external trigger conditions. Information from following V2X messages can serve as trigger variables. Furthermore, further V2X messages, which are not mentioned here, for which the concept correspondingly applies can also be developed or combined.

In some exemplary embodiments, the method can, as shown in FIG. 1a, also comprise obtaining 140 information about external trigger variables for the determination of the driving intention via a vehicle-to-vehicle interface, for example, the vehicle-to-vehicle interface 20. The determination 150 can also be based on the information about the external trigger variables.

The information about the external trigger variables can comprise, for example, at least one element of the group of vehicle-to-vehicle status messages, vehicle-to-vehicle driving intention messages and vehicle-to-vehicle messages with information on the environment of one or more other transportation vehicles 200. The vehicle-to-vehicle interface 20 can be designed, for example, to obtain the information about the external trigger variables as vehicle-to-vehicle messages to a plurality of receivers (also referred to as broadcasting).

The information on the environment can be based, for example, on on-board sensors of the other transportation vehicles 200. In at least some exemplary embodiments, the information on the environment can comprise sensor data of the other transportation vehicles 200, for example, sensor data relating to collective perception of the environment of the other transportation vehicles. The sensor data can correspond, for example, to raw data, for example, camera sensor data, radar sensor data, lidar sensor data and/or transit time sensor data, or it can correspond to processed data, for example, a distance and/or position of extraneous objects which are detected by the other transportation vehicles 200.

In one exemplary implementation, for example, the following vehicle-to-vehicle messages can be used as trigger variables for corresponding triggering conditions:

Cooperative Awareness Message (CAM, periodic status message of the transportation vehicle)

V2X transportation vehicles transmit in the CAM status information such as their position, speed, direction of travel, longitudinal acceleration and transverse acceleration, yaw rate, steering angle and the like. Basically, all these variables can be used as trigger variables. In this context, the accuracy of the information can be taken into account. The accuracy class is also transmitted as additional information for some of these information items. For example, movement images of V2X transportation vehicles in the surroundings of the transportation vehicle in question can be generated from the information in received CAMs. In addition, for example, location-dependent trigger conditions can be formulated therefrom together with a digital map.

Decentralized Environmental Notification Message (DENM, event-based message)

V2X transportation vehicles transmit information such as, for example, a hazardous situation, hazardous location, immobilized transportation vehicle and emergency service transportation vehicle in the DENM event information. Road-side infrastructure (also referred to as Roadside Unit) can also transmit DENMs. For example, the IRS (Intelligent Transport System (ITS) roadside system, road-side infrastructure of an intelligent transport system) of a roadworks protection system (for example, blocking trailer) could transmit a DENM with the warning about roadworks. A DENM includes inter alia information on the event type, on the event location as well as the event-dependent information such as blocked lanes. For example, trigger conditions, such as for example, no start of a lane change when an emergency service transportation vehicle DENM is received from a relevant road segment, can be formulated as DENM information. Location-dependent trigger conditions, such as for example, for the start of a maneuver for a lane change at a specific distance in front of the closure of a lane owing to roadworks can also be formulated on the basis thereof together with a digital map and other conditions.

Basic Safety Message (BSM)

The V2X messages CAM and DENM have been standardized for Europe. In the USA the BSM is used which contains corresponding information. Therefore, the observations regarding CAM and DENM apply analogously to BSM.

Signal Phase and Timing Message (SPAT)

A light signal system (LSA) transmits its phase information by a V2X message (SPAT message) to the road users in the surroundings. It is therefore possible, for example, to use functions such as "start of backed up traffic before a traffic light", "start-stop control at a traffic light" or "red light violation warning" (warning message about the infringement of a red traffic light phase) can use the traffic light phase information as triggers. The trigger variables can be the switchover times of the LSA here or the length of the phases (e.g., green phase)

Intention Message

Intentions such as lane change, cutting in, parking, leaving a parking space, allocation of road area for maneuvers (particularly in the case of large transportation vehicles such as trucks, buses and agricultural transportation vehicles or in the case of transportation vehicle combinations) can be transmitted to the road users by corresponding driving intention messages. Intentions can generally be used as trigger variables and can be utilized in trigger conditions for cooperative functions such as cooperative parking assistant, emergency braking assistant, cooperative ACC and cooperative lane change and cutting in assistant. In the case of cooperative functions there are the two roles of request and accept. In the request role, a "lane change" driving intention message could be transmitted. In the accept role, this message could serve as a trigger for the start of the "providing a gap" driving function.

Coordination Message/Agreement Message (cooperative agreement, coordination message)

In the case of cooperative agreement between road users, functionally dependent confirmation messages (accept, acknowledge) could be exchanged. These can be triggers for the start of corresponding driving functions or the next phases of the agreement process.

Environmental Perception Message (EPM)

In the EPM the transportation vehicle sends information relating to information on surroundings, such as detected dynamic and static objects, which has been acquired using the transportation vehicle's on-board sensor system (for example, radar, camera). Furthermore information can be derived from the information. For example, the length of a gap in front of a transportation vehicle is possibly identical to the distance from the transportation vehicle in front of it. The speed of movement of the gap is possibly identical to the speed of the measuring transportation vehicle. Such information can be used as a trigger, such as, for example, the length and speed of a gap for the cutting in assistant function. By the trigger it would be possible, for example, for a "synchronization with the gap/driving next to the gap to cut in" driving function to be started (even if other necessary trigger conditions are met).

In addition, the method can also comprise obtaining external trigger variables from a central location, for example, a server or a backend. Transportation vehicles can obtain information from a backend, for example, if there is a subscription to a mobility service or if the transportation vehicles are part of a transportation vehicle fleet. Information can relate to the traffic situation (hazard warning corresponding to DENM, average speeds on sections of road/ traffic jam), the digital map (map update) or else the transportation vehicle itself. Traffic information can serve as trigger variables, for example, corresponding to a DENM. The backend can, for example, also directly request the transportation vehicle to start the functions (specific services of a fleet operator or mobility service provider), for example, to acquire specific data with its on-board sensor system and/or to evaluate this data with a specific algorithm and then transmit the results to the backend. Corresponding specific service-dependent trigger variables are then to be defined.

In at least one exemplary embodiment, the V2X transportation vehicle can be in an assisted or partially automatic operating mode. The automated determination of the driving intention and generation of the driving intention message can be carried out on the basis of a situation analysis with a valuation of options for action. Traffic regulations can always be complied with. The algorithm/trigger condition for the automated decision to transmit a V2X intention message is presented below for various scenarios.

One scenario can be an "entry slip road onto a freeway or comparable road" with the following triggers:

The transportation vehicle is on an entry slip road (position on the digital map) (section of road)
AND
there is only the possibility of driving onto the freeway (road profile from the digital map) (possible driving intentions for the section of road)
=
Intention message is transmitted starting from a defined distance from the intersection point between the entry slip road and the freeway (start of acceleration lane) (triggering condition).

The restriction with regard to the option for action (only driving onto the freeway possible, the probability assigned to the trigger variable is very high) takes into account the situation of forks before the entry slip road. For example, the driving intention message can be transmitted in an automated state when the transportation vehicle passes the fork and there is clarity.

A further exemplary scenario of the exemplary embodiments can be a "lane change before end of lane/lane closure on a road with multiple lanes in one direction", with the following triggers:

The transportation vehicle is at a distance to be defined before the end of a lane (position on digital map)
OR
The transportation vehicle is at a distance to be defined before a lane closure (external trigger from the DENM of a roadworks IRS, a deployment transportation vehicle, information from a backend or the like)
AND
[no flashing indicator light activation driver intention OR no steering angle change driver intention which is greater than a defined interval]
=
message is transmitted starting from a defined distance from the end of the lane which can be driven on.

The section of road could be defined, for example, by patterns. For example, the digital map can comprise information about whether the current position is the "lane end/lane closure on a road with multiple lanes in one direction" pattern.

In the case of lane end or lane closure there is, apart from stopping before the end of the lane, frequently no alternative action to the lane change. It is therefore assumed that in the context of the assistance function stopping is considered only as a fallback solution if a lane change is not possible for reasons to do with the traffic. Therefore, in exemplary embodiments a very high probability is assigned to the transportation vehicle position trigger variable.

The distances are defined, for example, either as a function of the maximum permissible speed or dynamically as a function of the transportation vehicle speed.

In this context, the remaining time for a possible lane change maneuver can also be taken into account. The time interval in which the lane change is to have taken place can be defined in a such way that a safe and comfortable lane change is possible. The length of the interval can be defined either statically or as a function of the current traffic density.

In the scenario described above, the driver has not yet autonomously shown his intention through, for example, activation of a flashing direction indicator light. In exemplary embodiments, the transportation vehicle can act automatically in advance with the transmission of the driving intention message. This can be supplemented by instructions at the suitable point to the driver to perform the lane change.

A further exemplary scenario of the exemplary embodiments can be a "lane change due to traffic situation", having the following triggers:

The transportation vehicle is travelling on a road with multiple lanes in its direction of travel (section of road)
AND
The transportation vehicle obtains information about the instantaneous average speed (or another relevant variable) for the individual lanes of the segment of road in the direction of travel from a backend for mobility services (external trigger variable of backend)
OR
The transportation vehicle obtains information about speeds of the transportation vehicles in its surroundings from the V2X messages (for example, CAM, BSM) and can itself identify the instantaneous average speed (or another relevant variable) for the individual lanes of the segment of road in the direction of travel (V2X messages evaluated external trigger variable)
OR
The transportation vehicle has information about the expected average speed (or another relevant variable) for the individual lanes of the segment of road in the direction of travel (for example, stored in the digital map on the basis of historical data)
AND
The transportation vehicle located on a lane with an adjacent lane with a lower predicted or identified current average speed (or another relevant variable) in the segment of road in the direction of travel
AND
The driver is requested via a HMI (Human-Machine Interface) to change lane or is informed about the traffic situation in an accurate way with respect to lanes (for example, the lanes are colored as a function of the expected or instantaneous average speed)

AND
Activation of flashing direction indicator light driver intention
=
Intention message is transmitted.

The scenario treated above corresponds to navigation in an accurate way with respect to the lane. However, the algorithm can also expire if navigation with route guidance does not take place. For example, the traffic situation is then displayed accurately with respect to the lane. The driving intention message cannot be output, for example, until after the driver's interaction has taken place, for example, because owing to the existence of other options for action (remain on the lane) the probability of the lane change is sufficiently high enough only after information about the traffic situation and is also not sufficiently high until after an action request.

In addition to trigger conditions for the automatic transmission of a driving intention message, trigger conditions for aborting or the ending of the making available process 160 are also possible. For example, the making available process 160 can also be based on the (internal and/or external) trigger variables. For example, situations can occur which can require aborting of the planned cooperative maneuver or aborting of the preparation thereof, or require that the maneuver is terminated and ended. In the text which follows, possible corresponding triggers are specified.

The driver actively breaks off the function (for example, steering back during the lane change).

A message with higher priority is received which requests a different maneuver. For example, an approaching emergency services transportation vehicle requests formation of a gap in the traffic. The reception of a DENM of a corresponding emergency services transportation vehicle then brings about aborting of the transmission of the lane change driving intention message.

The preconditions for the planned maneuver in terms of traffic are no longer met or the reason for the planned lane change no longer applies.
- the transportation vehicle which is travelling slowly in front of the transportation vehicle in question (reason for the planned lane change) accelerates and the difference between the desired speed (for example, ACC set speed) and the actually possible speed with the transportation vehicle in question on the lane drops below a threshold to be defined (for example, <5 km/h) or even becomes negative (the transportation vehicle moves away at a speed which is higher than the ACC set speed).
- on the target lane (lane after the lane change) the speed drops because of a traffic event, with the result that a lower speed will be possible there than on the current lane.
- possible weather events (for example, possible sudden heavy rain, fog, black ice, dust) do not permit the planned speed on the segment of road which is to be driven on next.

The maneuver is ended (definition of termination of the maneuver=target reached)
- on the basis of the position of the transportation vehicle in question on the road, for example, in the case of a simple lane change: the identification of a change of lane by GPS or on-board sensor system (for example, camera)
- travel points of a navigation route are reached
- flashing direction indicator light springs back
- end of a maneuver detected by driver assistance system (for example, the end of the parking maneuver in the case of the parking assistant)

An exemplary embodiment is a computer program for carrying out at least one of the methods described above when the computer program runs on a computer, a processor or a programmable hardware component. A further exemplary embodiment is also a digital storage medium which is machine-readable or computer-readable and which has electronically-readable control signals which can interact with a programmable hardware component in such a way that one of the methods described above is executed.

The features which are disclosed in the description above, the following claims and the appended figures can be significant and implemented both individually as well as in any desired combination for the implementation of an exemplary embodiment in its various configurations.

Although some embodiments have been described in relation to a device, it goes without saying that these embodiments also constitute a description of the corresponding method, and a block or a component of a device is therefore also to be understood as being a corresponding method operation or a feature of a method operation. By analogy, embodiments which have been described in relation to a method operation or as a method operation also constitute a description of a corresponding block or detail or feature of a corresponding device.

Depending on the specific implementation requirements, exemplary embodiments can be implemented using hardware or software. The implementation can be carried out using a digital storage medium, for example, a floppy disk, a DVD, a Blu-Ray disk, a CD, a ROM, a PROM, an EPROM, an EEPROM or a FLASH memory, a hard disk or some other magnetic or optical memory in which electronically-readable control signals, which interact or can interact with a programmable hardware component in such a way that the respective method is carried out, are stored.

A programmable hardware component can be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC) system, a programmable logic element or a field-programmable gate array with a microprocessor (FPGA=Field Programmable Gate Array).

The digital storage medium can therefore be machine-readable or computer-readable. Some exemplary embodiments therefore comprise a data carrier which has electronically-readable control signals which are capable of interacting with a programmable computer system or a programmable hardware component in such in way that one of the methods described here is carried out. An exemplary embodiment is therefore a data carrier (or a digital storage medium or computer-readable medium) in which the program for carrying out one of the methods described here is recorded.

Exemplary embodiments can generally be implemented as a program, firmware, computer program or computer program product with a program code or as data, wherein the program code or the data is effective in carrying out one of the methods when the program runs on a processor or a programmable hardware component. The program code or the data can also be stored, for example, on a machine-readable carrier or data carrier. The program code or the data can be present, inter alia, as source code, machine code or byte code or as some other intermediate code.

A further exemplary embodiment is also a data stream, a signal sequence or a sequence of signals which constitutes or constitute the program for carrying out one of the methods described here. The data stream, the signal sequence or the sequence of signals can be configured, for example, to be transferred via a data communication link, for example, over the Internet or some other network. Exemplary embodiments are therefore also signal sequences which represent data and which are suitable for transmission over a network or a data communication link, wherein the data constitute the program.

A program according to an exemplary embodiment can implement one of the methods during its execution in that, for example, the program reads out memory locations or writes one or more data items into the locations, as result of which, if appropriate, switching processes or other processes are brought about in transistor structures, in amplifier structures or in other components which are electrical, optical, magnetic or operate according to some other functional principle. Correspondingly, data, values, sensor values or other information can be acquired, determined or measured by reading out a memory location. A program can therefore acquire, determine or measure variables, values, measurement variables and other information by reading out one or more memory locations, and can bring about an action or carry out an action and actuate other devices, machines and components by writing into one or more memory locations.

The exemplary embodiments described above constitute merely an illustration of the principles of the present disclosure. It goes without saying that modifications and variations of the arrangements and details described herein will be apparent to other specialists. It is therefore intended that the disclosure will be limited only by the scope of protection of the following patent claims and not by their specific details which have been presented here on the basis of the description and the explanation of the exemplary embodiments.

LIST OF REFERENCE NUMBERS

10 Transportation vehicle communication system
12 Positioning module
14 Control module
16 Storage module
18 Interface
20 Vehicle-to-vehicle interface
100 Transportation vehicle
110 Determining a position
120 Identifying a section of road
130 Obtaining information about internal trigger variables
140 Obtaining information about external trigger variables
150 Determining the driving intention
160 Making available a driving intention message
200 Further transportation vehicles

The invention claimed is:

1. A method for determining a driving intention for a transportation vehicle, wherein the driving intention comprises information about a predicted driving maneuver, the method comprising:
  determining a position of the transportation vehicle;
  identifying a section of road based on the position of the transportation vehicle and a digital map;
  assigning two or more possible driving intentions to the identified section of road;
  obtaining information about internal trigger variables based on on-board sensors or actuators of the transportation vehicle;
  assigning one or more triggering conditions to the two or more possible driving intentions and assigning probability of intention to each of the one or more trigger conditions if met; and
  determining the driving intention based on the identified section of road, the information about the internal trigger variables and the one or more triggering conditions.

2. The method of claim 1, further comprising making available a driving intention message via a vehicle-to-vehicle interface for one or more other transportation vehicles based on the driving intention.

3. The method of claim 1, wherein the determination corresponds to satellite-based determination of the position.

4. The method of claim 1, further comprising obtaining information about external trigger variables for the determination of the driving intention via a vehicle-to-vehicle interface, wherein the determination is also based on the information about the external trigger variables.

5. The method of claim 4, wherein the information about the external trigger variables comprises at least one element from the group of vehicle-to-vehicle status messages, vehicle-to-vehicle driving intention messages and vehicle-to-vehicle messages with information on the surroundings of one or more other transportation vehicles.

6. The method of claim 1, wherein the triggering conditions are based on one or more probability functions based on the trigger variables.

7. The method of claim 1, wherein the determination is also based on a navigation function of the transportation vehicle.

8. The method of claim 1, wherein the determination is also based on information about traffic regulations, wherein the determination of the driving intention determines the driving intention so that no traffic regulations are infringed.

9. The method of claim 1, wherein the determination is based on a learning function, wherein the determination also bases the driving intention on preceding driving maneuvers of a driver of the transportation vehicle.

10. A transportation vehicle communication system for determining a driving intention for a transportation vehicle, wherein the driving intention comprises information about a predicted driving maneuver, comprising: determining a position of the transportation vehicle; identifying a section of road based on the position of the transportation vehicle and a digital map, wherein one or more possible driving intentions are assigned to the section of road, and wherein the one or more possible driving intentions are assigned one or more triggering conditions based on one or more trigger variables; assigning two or more possible driving intentions to the identified section of road; obtaining information about internal trigger variables based on on-board sensors or actuators of the transportation vehicle; assigning one or more triggering conditions to the two or more possible driving intentions and assigning probability of intention to each of the one or more trigger conditions if met; and determining the driving intention based on the identified section of road, the information about the internal trigger variables and the one or more triggering conditions.

11. The system of claim 10, further comprising making available a driving intention message via a vehicle-to-vehicle interface for one or more other transportation vehicles based on the driving intention.

12. The system of claim 10, wherein the determination corresponds to satellite-based determination of the position.

13. The system of claim 10, wherein the system obtains information about external trigger variables for the determination of the driving intention via a vehicle-to-vehicle interface, wherein the determination is also based on the information about the external trigger variables.

14. The system of claim 13, wherein the information about the external trigger variables comprises at least one element from the group of vehicle-to-vehicle status messages, vehicle-to-vehicle driving intention messages and vehicle-to-vehicle messages with information on the surroundings of one or more other transportation vehicles.

15. The system of claim 10, wherein the triggering conditions are based on one or more probability functions based on the trigger variables.

16. The system of claim 10, wherein the determination is also based on a navigation function of the transportation vehicle.

17. The system of claim 10, wherein the determination is also based on information about traffic regulations, wherein the determination of the driving intention determines the driving intention so that no traffic regulations are infringed.

18. The system of claim 10, wherein the determination is based on a learning function, wherein the determination also bases the driving intention on preceding driving maneuvers of a driver of the transportation vehicle.

19. A non-transitory software medium that includes instructions, which when implemented by a processor, perform a method for determining a driving intention for a transportation vehicle, wherein the driving intention comprises information about a predicted driving maneuver, the method comprising: determining a position of the transportation vehicle; identifying a section of road based on the position of the transportation vehicle and a digital map; assigning two or more possible driving intentions to the identified section of road; obtaining information about internal trigger variables based on on-board sensors or actuators of the transportation vehicle; assigning one or more triggering conditions to the two or more possible driving intentions and assigning probability of intention to each of the one or more trigger conditions if met; and determining the driving intention based on the identified section of road, the information about the internal trigger variables and the one or more triggering conditions.

* * * * *